(12) United States Patent
Dean

(10) Patent No.: US 7,700,692 B2
(45) Date of Patent: Apr. 20, 2010

(54) PROCESS FOR RECYCLING POLYOLEFIN BLEND COMPOSITION USING AN ETHYLENE COPOLYMER COMPATIBILIZING AGENT

(75) Inventor: David M. Dean, West Chester, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 483 days.

(21) Appl. No.: 11/413,553

(22) Filed: Apr. 28, 2006

(65) Prior Publication Data

US 2007/0255007 A1  Nov. 1, 2007

(51) Int. Cl.
- C08L 23/00 (2006.01)
- C08L 23/04 (2006.01)
- C08L 33/00 (2006.01)
- C08L 33/06 (2006.01)
- C08L 35/00 (2006.01)

(52) U.S. Cl. .................. 525/191; 525/207; 525/217; 525/223; 525/240

(58) Field of Classification Search ................. 525/191, 525/207, 217, 223, 240
See application file for complete search history.

(56) References Cited

U.S. PATENT DOCUMENTS

| | | | |
|---|---|---|---|
| 4,174,358 A | 11/1979 | Epstein | |
| 5,179,164 A | 1/1993 | Lausberg et al. | |
| 5,278,229 A * | 1/1994 | Asano et al. | ............ 525/57 |
| 5,408,000 A | 4/1995 | Katsaros et al. | |
| 6,077,906 A | 6/2000 | Thiruvengada et al. | |
| 6,294,602 B1 | 9/2001 | Shimo et al. | |
| 2005/0228145 A1 | 10/2005 | Lacroix et al. | |

FOREIGN PATENT DOCUMENTS

| | | |
|---|---|---|
| EP | 1479725(A1) | 11/2004 |
| GB | 1157569 | 7/1969 |
| WO | WO 98/04156 | 9/1998 |
| WO | WO 03/099930(A1) | 12/2003 |
| WO | WO 2005/115748(A1) | 12/2005 |

OTHER PUBLICATIONS

K. Hausmann, "Compatibilizers, Polymeric (Recycling of Multilayer Structures)", Polymeric Materials Encyclopedia, CRC Press, NY, 1996, vol. 2, pp. 1364-1377.

\* cited by examiner

*Primary Examiner*—Nathan M Nutter

(57) ABSTRACT

A process is provided for preparing polymer composites from compositions comprising i) a polyolefin, ii) a polymer selected from the group consisting of polymers having hydroxyl groups and polymers having amino groups and iii) a polar ethylene copolymer having copolymerized units selected from the group consisting of $C_4$-$C_8$ unsaturated anhydrides, monoesters of $C_4$-$C_8$ unsaturated acids having at least two carboxylic acid groups, diesters of $C_4$-$C_8$ unsaturated acids having at least two carboxylic acid groups and mixtures thereof. The process is suitable for use with recycle streams that contain polymeric materials that are laminates or composites of dissimilar polymers.

11 Claims, No Drawings

PROCESS FOR RECYCLING POLYOLEFIN BLEND COMPOSITION USING AN ETHYLENE COPOLYMER COMPATIBILIZING AGENT

FIELD OF THE INVENTION

This invention relates to a method for recycling thermoplastic polymers. The invention also relates to polymer blend compositions that are easily processable and to articles prepared from such compositions.

BACKGROUND OF THE INVENTION

Many consumer and industrial products are formed from thermoplastic composite or laminate materials. Such materials include for example container walls and countertop materials. For a variety of aesthetic and functional reasons the composites or laminates may be composed of quite dissimilar polymers. For example, composite materials are often blends of two or more polymers that are present in discrete phases within the polymer matrix, due to the differing chemical properties of each polymeric component. Laminated materials often are designed to have particular barrier properties and contain plies made from dissimilar polymers. The polymeric materials of the various layers then act to transmit or prevent transmission of certain gases in a controlled manner. For example, a container lid or a fuel tank wall may be a laminated material that contains a polar polymer and a non-polar polymer in separate layers.

Some commonly used polymers that are present in laminated or composite materials include polyamides, polyolefins, polyesters and ethylene copolymers. Among this latter group are ethylene copolymers having polar comonomers, such as ethylene vinyl alcohol copolymers, ethylene acrylic acid copolymers and ethylene methacrylic acid copolymers. Recycling processes have the potential to convert such laminated or composite materials into useful raw materials, but in many cases the basic incompatibility of the polymers in the recyclable product leads to production of non-homogeneous blends that have unacceptable physical properties. One solution to this problem is the use of additives that compatibilize dissimilar polymers. For example, in U.S. Pat. No. 6,294,602 a process for recycling a mixture of ethylene vinyl alcohol copolymer and a thermoplastic resin using a compatibilizer that is a mixture of a polyamide resin and an ethylene-unsaturated carboxylic acid random copolymer or its metal salt is disclosed. Other compatibilizers are disclosed in K. Hausmann, "*Compatibilizers, Polymeric (Recycling of Multilayer Structures)*", Polymeric Materials Encyclopedia, CRC Press, NY, 1996, vol. 2, pp. 1364-1377.

Maleated polymers are a useful class of compatibilizing agents and toughening agents for thermoplastic polymers. Such polymers include maleic anhydride-grafted polyolefins and ethylene copolymers having copolymerized monomer units of maleic acid, maleic acid esters or maleic anhydride. For example, U.S. Pat. No. 5,179,164 discloses molding compositions comprising polypropylenes, polyamides and ethylene copolymers grafted with maleic anhydride. PCT Published Application No. WO 98/41576 discloses toughened polyamides that are blends of ultrahigh density polyethylene, polyamide and maleic anhydride graft copolymers. In addition, U.S. Pat. Nos. 4,174,358 and 5,408,000 and PCT Published Application No. WO 03/099930A1 disclose various impact modifiers for polyamides that include maleated polymers.

Maleic anhydride grafted polyolefins are generally prepared on a commercial scale by grafting maleic anhydride onto a polymeric backbone material, such as polyethylene, polypropylene, styrene-ethylene-butene-styrene triblock copolymer or polybutadiene. Maleated compatibilizers of this type include, e.g. Fusabond® MB 226DE and Fusabond® MD 353D adhesive resins, available from E. I. du Pont de Nemours and Company. Another class of maleated compatibilizers includes ethylene dipolymers and higher order copolymers that contain copolymerized units of e.g. maleic acid.

Although maleated polymers have been used as compatibilizers for various resins, their potential as additives in recycling operations has not been fully utilized and optimized. It would be desirable to have a process available that makes more effective use of this class of compatibilizing agents in recycling processes. In addition, it would be useful to have a process available that could more effectively compatibilize dissimilar polymers made from virgin materials. Compositions produced by such processes would be economical raw materials for fabricating consumer and industrial goods.

SUMMARY OF THE INVENTION

The present invention is directed to a process for preparing a polymer composite comprising the steps of
A. forming a composition by combining
1. a polymer blend comprising
a. a first polymer selected from the group consisting of polyethylenes and copolymers of ethylene and a $C_3$-$C_{10}$ alpha-olefin; and
b. a second polymer selected from the group consisting of polymers having hydroxyl groups and polymers having amino groups;
wherein said polymer blend has a moisture content greater than 250 ppm water, based on the total weight of said first and second polymers; and
2. a third polymer that is a polar copolymer produced by a high pressure random copolymerization process, said polar copolymer comprising copolymerized units of ethylene and from about 3 wt. % to about 25 wt. %, based on the weight of the polar copolymer, of a comonomer selected from the group consisting of $C_4$-$C_8$ unsaturated anhydrides, monoesters of $C_4$-$C_8$ unsaturated acids having at least two carboxylic acid groups, diesters of $C_4$-$C_8$ unsaturated acids having at least two carboxylic acid groups and mixtures thereof;
wherein said composition comprises, based on the total weight of said first, second and third polymers, 55-98 wt. % of said first polymer, 2-45 wt. % of said second polymer and 0.1-10 wt. % of said third polymer;
B. subjecting said composition to high shear mixing to form a polymer composite that is a homogeneous blend; and
C. recovering said polymer composite.

The invention is further directed to an easily processable composition prepared by combining:
A. a polymer blend comprising
1. a first polymer selected from the group consisting of polyethylenes and copolymers of ethylene and a $C_3$-$C_{10}$ alpha-olefin; and
2. a second polymer selected from the group consisting of polymers having hydroxyl groups and polymers having amino groups;
wherein said polymer blend has a moisture content greater than 250 ppm water, based on the total weight of said first and second polymers; and
B. a third polymer that is a polar copolymer produced by a high pressure random copolymerization process, said polar copolymer comprising copolymerized units of ethylene and from about 3 wt. % to about 25 wt. %, based on the weight of the polar copolymer, of a comonomer selected from the group consisting of $C_4$-$C_8$ unsaturated anhydrides, monoesters of $C_4$-$C_8$ unsaturated acids having at least two carboxylic acid groups, diesters of $C_4$-$C_8$ unsaturated acids having at least two carboxylic acid groups and mixtures thereof;

wherein said processable composition comprises, based on the total weight of said first, second and third polymers, 55-98 wt. % of said first polymer, 2-45 wt. % of said second polymer and 0.1-10 wt. % of said third polymer.

The invention is also directed to a process for preparing a shaped article from a composite material which comprises the steps of A. preparing a composite material by a process comprising the steps of
  1. forming a composition by combining
    a. a polymer blend comprising
      (1) a first polymer selected from the group consisting of polyethylenes and copolymers of ethylene and a $C_3$-$C_{10}$ alpha-olefin; and
      (2) a second polymer selected from the group consisting of polymers having hydroxyl groups and polymers having amino groups;
    wherein said polymer blend has a moisture content greater than 250 ppm water, based on the total weight of said first and second polymers; and
    b. a third polymer that is a polar copolymer produced by a high pressure random copolymerization process, said polar copolymer comprising copolymerized units of ethylene and from about 3 wt. % to about 25 wt. %, based on the weight of the polar copolymer, of a comonomer selected from the group consisting of $C_4$-$C_8$ unsaturated anhydrides, monoesters of $C_4$-$C_8$ unsaturated acids having at least two carboxylic acid groups, diesters of $C_4$-$C_8$ unsaturated acids having at least two carboxylic acid groups and mixtures thereof;
    wherein said composition comprises, based on the total weight of said first, second and third polymers, 55-98 wt. % of said first polymer, 2-45 wt. % of said second polymer and 0.1-10 wt. % of said third polymer; and
  2. subjecting said composition to high shear mixing to form a homogeneous composite material; and B. forming said composite material into a shaped article.

DETAILED DESCRIPTION OF THE INVENTION

The present invention is directed to a process for preparing polymer composite compositions that are useful as raw materials for molded goods. The process is particularly suited for preparing composites that are homogeneous polymer blend compositions from recycle streams, where the recyclable material consists of articles and compositions that have dissimilar polymeric components. By homogeneous blend is meant a blend that is composed of either a continuous phase or is composed of two or more discontinuous phases where the particle size of the largest domain of the minor phase is no more than 6 times the average particle size of the minor phase domains as measured in a transmission electron micrograph image. In general, the process comprises the steps of providing a particular polymer blend composition having a suitable moisture content, mixing the blend with a random copolymer to form an easily processable composition and mixing the composition under conditions of high shear to form a compatibilized mixture. Due to the composition and steps of the process the compatibilized mixture is a composite that is a homogeneous blend. The process is particularly useful in recycling operations, but may also be used with virgin polymer materials.

The easily processable composition comprises three polymeric components and has a particular moisture content. The first polymer component is a polyethylene or a copolymer of ethylene and a $C_3$-$C_{10}$ alpha-olefin. "Copolymer", as the term is used herein, has its conventional meaning known to one of ordinary skill in the art to be a polymer formed by the copolymerization of two or more monomers to yield a single polymer. Copolymers include dipolymers, terpolymers and higher order copolymers.

Polyethylenes suitable for use in the process of the invention may be for example, high density polyethylenes, low density polyethylenes, medium density polyethylenes or ultrahigh density polyethylenes, any of which may be branched or unbranched. These polymers may be prepared by any process known in the art, among which are high pressure free radical polymerization processes and low pressure catalytic processes such as Ziegler-Natta catalysis or catalysis with metallocene catalyst systems, for example those processes disclosed in U.S. Pat. Nos. 5,272,236 and 5,278,272.

The ethylene copolymers may be thermoplastic or elastomeric ethylene copolymers of ethylene with one or more comonomers selected from propylene, 1-butene, 1-hexene, 1-octene, 4-methyl-1-pentene, and other $C_3$-$C_{20}$ alpha-olefins. Thermoplastic ethylene alpha-olefin polymers include the class known as linear low density polyethylenes. Particularly useful examples include copolymers of ethylene and at least one ethylenically unsaturated monomer selected from the group consisting of $C_3$-$C_8$ alpha monoolefins, Specific examples of these polymers are copolymers of ethylene with propylene, butene, 3-methyl-1-pentene, hexene, or octene. Preferred olefin polymers are polyethylene and copolymers of ethylene and $C_4$-$C_8$ alpha-olefins, such as ethylene butene copolymers and ethylene octene copolymers. The olefin polymers have number average molecular weights within the range of 1,000 to 300,000, preferably from 50,000 to 300,000. Commercially available polymers include Sclair® polyethylene resins available from Nova Chemicals Corp. and Engage® polyolefin elastomers available from The Dow Chemical Co. Preferably, the first polymer component is a thermoplastic polymer that can be processed in the melt at temperatures below 220° C. Preferably, the polymer is a substantially linear ethylene polymer, such as those described in U.S. Pat. No. 5,272,236; U.S. Pat. No. 5,278,272, U.S. Pat. No. 5,507,475, U.S. Pat. No. 5,264,405, and U.S. Pat. No. 5,240,894.

Copolymers of the EPDM class, which are elastomeric copolymers of ethylene, propylene, and a diene may also be used in the process of the invention. These copolymers can be terpolymers, tetrapolymers or higher order copolymer elastomers of the ethylene/propylene/diene type and are copolymers of ethylene, propylene and at least one non-conjugated diene. They may, in addition, contain a minor amount, generally up to 10 weight percent, of at least one other diene or triene copolymerized monomer having copolymerizable double bonds. Non-conjugated dienes commonly used as comonomers in EPDM terpolymers include 1,4-hexadiene; 2-methyl-1,5-hexadiene; vinyl norbornene; 8-methyl-4-ethylidene-1,7-octadiene; 1,9-octadecadiene; dicyclopentadiene; tricyclopentadiene; 5-ethylidene-2-norbornene; or 5-methylene-2-norbornene. Preferred dienes having one reactive double bond are 1,4-hexadiene, dicyclopentadiene and ethylidene norbornene. Non-conjugated dienes commonly used as an additional monomer in EPDM tetrapolymers include norbornadiene; 1,4-pentadiene; 1,5-hexadiene; 1,7-octadiene; 1,2-heneicosadiene; or 5-(5-hexenyl)-2-norbornene, preferably norbornadiene. These polymers are generally produced by polymerization in the presence of Ziegler-Natta catalysts or by polymerization in the presence of metallocene catalysts. Preparative techniques for ethylene alpha-olefin elastomers prepared in the presence of metallocene catalysts may be found in U.S. Pat. Nos. 5,278,272 and 5,272,236. Typical EPDM elastomers are commercially available as Nordel® hydrocarbon rubbers from The Dow Chemical Company.

The second polymer component in the blends useful in the process of the invention is a thermoplastic resin that contains hydroxyl groups or amino groups. Examples of such resins include ethylene vinyl alcohol (EVOH), nylon 6 and nylon 6,6. Of the hydroxyl group containing polymers, EVOH is preferred because of its ready availability.

EVOH generally has an ethylene content of between about 15 mole percent to about 60 mole percent, more preferably between about 27 to about 44 mole percent. EVOH generally has a density ranging from between about 1.12 g/cm$^3$ to about 1.20 gm/cm$^3$ and a melting temperature ranging from between about 142° C. and 191° C. The polymer can be prepared by known preparative techniques or can be obtained from commercial sources. It is prepared by saponifying or hydrolyzing ethylene vinyl acetate copolymers. The degree of hydrolysis is preferably from about 50 to 100 mole percent, more preferably from about 85 to 100 mole percent. In addition, the weight average molecular weight of the EVOH component, calculated from the degree of polymerization and the molecular weight of the repeating unit, may be within the range of about 5,000 $M_w$ to about 300,000 $M_w$, with about 60,000 $M_w$ being most preferred. Suitable EVOH polymers for use as components in the compositions of the present invention may be obtained from EVAL Company of America under the tradename EVAL® resins. EVOH is also available under the tradename Evalca® from Kuraray Ltd. and under the tradename Soarnol® from Noltex L.L.C.

Polymers that contain amino groups include polyamides and polyamide resins such as nylon 6, nylon 6/6, nylon 6/12, nylon 12 and poly(amide 6-b-ethylene oxide). Polyamide resins are well known in the art and embrace those semi-crystalline and amorphous resins having a weight average molecular weight of at least 5,000 and commonly referred to as nylons. The polyamide resin can be produced by condensation polymerization of equimolar amounts of a saturated dicarboxylic acid containing from 4 to 12 carbon atoms with a diamine, in which the diamine contains from 4 to 14 carbon atoms. Excess diamine can be employed to provide an excess of amine end groups over carboxyl end groups in the polyamide. Examples of polyamides include polyhexamethylene adipamide (66 nylon), polyhexamethylene azelaamide (69 nylon), polyhexamethylene sebacamide (610 nylon) and polyhexamethylene dodecanoamide (612 nylon), the polyamide produced by ring opening of lactams, i.e. polycaprolactam, polylauric lactam, poly-11-aminoundecanoic acid, and bis(paraaminocyclohexyl)methanedodecanoamide. It is also possible to use polyamides prepared by the copolymerization of two of the above polymers or terpolymerization of the above polymers or their components, e.g. an adipic, isophthalic acid hexamethylene diamine copolymer.

The third polymer component that is present in the easily processable composition is a compatibilizer that is a polar ethylene copolymer. The copolymer comprises copolymerized units of ethylene and a comonomer selected from the group consisting of $C_4$-$C_8$ unsaturated anhydrides, monoesters of $C_4$-$C_8$ unsaturated acids having at least two carboxylic acid groups, diesters of $C_4$-$C_8$ unsaturated acids having at least two carboxylic acid groups and mixtures of such copolymers. Additionally, the ethylene copolymer comprises from about 3 wt. % to about 25 wt. % copolymerized units of the comonomer. The copolymer may be a dipolymer or a higher order copolymer, such as a terpolymer or tetrapolymer. Examples of suitable comonomers of the third polymer component include unsaturated anhydrides such as maleic anhydride, and itaconic anhydride; $C_1$-$C_{20}$ alkyl monoesters of butenedioc acids (e.g. maleic acid, fumaric acid, itaconic acid and citraconic acid), including methyl hydrogen maleate, ethyl hydrogen maleate, propyl hydrogen fumarate, and 2-ethylhexyl hydrogen fumarate; $C_1$-$C_{20}$ alkyl diesters of butenedioic acids such as dimethylmaleate, diethylmaleate, and dibutylcitraconate, dioctylmaleate, and di-2-ethylhexylfumarate. Of these, maleic anhydride, ethyl hydrogen maleate and methyl hydrogen maleate are preferred. Maleic anhydride and ethyl hydrogen maleate are most preferred.

Higher order copolymers that are examples of the third polymer component include terpolymers such as ethylene/methyl acrylate/ethyl hydrogen maleate, ethylene/butyl acrylate/ethyl hydrogen maleate and ethylene/octyl acrylate/ethyl hydrogen maleate.

The polar ethylene copolymers act as compatibilizers for the first two polymeric components, which are dissimilar chemically, i.e. the first is a non-polar polymer and the second is a polar polymer. By compatibilizer is meant that the third component is capable of chemically reacting with the second component, thereby promoting a strong interface with the first and second components which results in improved impact strength over the uncompatibilized mixture of the first and second components. The ethylene copolymers that are useful in the invention have a rather high level of copolymerized polar monomer (i.e. the monomer selected from the group consisting of $C_4$-$C_8$ unsaturated anhydrides, monoesters of $C_4$-$C_8$ unsaturated acids having at least two carboxylic acid groups and diesters of $C_4$-$C_8$ unsaturated acids having at least two carboxylic acid groups). As a result they have high compatibilizing potential. The copolymers are synthesized by random copolymerization of ethylene and the particular comonomer or comonomers in a high-pressure free radical autoclave process. Such processes are described in U.S. Pat. No. 4,351,931. Direct polymerization eliminates the secondary process step of grafting which is used to incorporate maleic anhydride into many maleated polymers. Grafting has been traditionally used to create maleated compatibilizers, a large number of which are available commercially from E. I. du Pont de Nemours and Company, such as Fusabond® barrier resins which include polymers such as linear low density polyethylene grafted with maleic anhydride (LLDPE-g-MAH), high density polyethylene grafted with maleic anhydride (HDPE-g-MAH), and polypropylene grafted with maleic anhydride (PP-g-MAH).

The random copolymerization process permits synthesis of polar polymers having a higher degree of reactivity than the more readily available graft copolymers. It is believed that the compatibilizer acts as a coupling agent for the other polymer components of the polymer blend. However, whether it acts as a coupling agent or by some other mode is not critical in the practice of the present invention. It is preferable to use as little of the compatibilizing material as necessary to obtain the result desired. Therefore, generally, it is desirable to have as high a content of the above-described comonomer as can be obtained, so as to gain the compatibilizing effect with the least amount of compatibilizer. In this regard it is preferable that the third polymer includes at least about 3 wt % copolymerized anhydride, monoester or diester comonomer, based on the weight of the copolymer. In practice, it is only the process for producing the third polymer that limits the upper limit for incorporation of the comonomer. Preferably, the comonomer is in the range of greater than about 3 wt. % to about 25 wt. %, based on the weight of the copolymer. More preferably, the comonomer is incorporated into the copolymer in an amount of from about 3.5 wt. % to about 15 wt. %, most preferably in a range of from about 4 wt. % to about 12.5 wt. %.

The polymer blend compositions that are used in the process of the invention must contain a rather high level of moisture. It is generally understood in the art that EVOH resins and polyamides should contain low levels of moisture for easy processing. For example, it is stated by EVAL Americas in Technical Bulletin No. 100, "Moisture Absorption and Drying of EVAL® Resins", that "if the moisture content of EVAL® resins exceeds 0.50%, it should be dried using a circulating hot air dryer." In order for the full compatibilizing potential of the third polymer to be realized in the process of the invention, however, the processable polymer composition must have an elevated moisture content. This is provided when water is present in the polymer blend composition comprising the first and second polymers at a level of greater than 250 ppm, based on the total weight of the first and second polymers. In the process of the invention the polymer blend that comprises the first and second polymers is combined with the third polymer to form a composition that is subjected to high shear mixing in a subsequent step. In order for efficient compatibilization, it has been found that it is necessary that the moisture level be greater than 250 ppm in the polymer blend composition of the first and second polymers even though it is recognized in the art that water often interferes with the reaction between anhydride groups and hydroxyl or amine groups. Preferably, the water content in the polymer blend of the first and second polymers will be greater than 300 ppm, based on the total weight of the first and second polymers.

The above-described first, second and third polymer components are present in the easily processable polymer blend in the following specified amounts, based on the total weight of the three polymers. The first polymer, i.e. the polyethylene or ethylene alpha-olefin, is present in an amount of 55-98 wt. %, preferably 70-95 wt. %. The second polymer, i.e. the polymer having hydroxyl or amino groups, is present in an amount of 2-45 wt. %, preferably 5-30 wt. %. The third polymer, i.e. the polar copolymer, is present in an amount of from about 0.1 to about 10 weight %, preferably in an amount of from about 0.1 wt % to about 5 wt %, more preferably in an amount of from about 1 wt % to about 4 wt %.

A preferred processable composition suitable for use in the process of the invention consists essentially of 55-98 wt. %, preferably 70-95 wt. % of the first polymer, 2-45 wt. %, preferably 5-30 wt. % of a second polymer having hydroxyl groups, and 0.1-10 wt. % of the polar copolymer, where the weight percentages are based on the total weight of the three polymers. The water content of the compositions of these preferred compositions will be as described above. That is, the moisture content will be greater than 250 ppm in the composition that consists essentially of the first polymer and second polymers, based on the total weight of the first and second polymers. Preferably the water content of the polymer blend will be 300 ppm, based on the total weight of the first and second polymers prior to mixing the polymer blend with the third polymer.

The compositions of the present invention can further include optional materials, such as conventional additives used in polymeric materials including plasticizers, stabilizers including viscosity stabilizers and hydrolytic stabilizers, antioxidants, ultraviolet ray absorbers, anti-static agents, dyes, pigments or other coloring agents, inorganic fillers, fire-retardants, lubricants, reinforcing agents such as glass fiber and flakes, foaming or blowing agents, processing aids, antiblock agents, release agents, and/or mixtures thereof. Optional ingredients, when used, can be present in various amounts so long as they are not used in an amount that detracts from the basic characteristics of the composition.

Lubricants that are metal salts of higher aliphatic carboxylic acids, where the acids have from 8 to 22 carbon atoms are a particularly useful class of optional additives. Such acids include stearic acid, lauric acid, undecanoic acid, palmitic acid and tricosanic acid. The metal ions include sodium, potassium, magnesium, calcium, zinc, barium and aluminum ions. Preferred metal ions are zinc and calcium. A preferred salt is zinc stearate. Other preferred salts are calcium or magnesium stearate. It has been found that when at least one of these salts, especially zinc stearate, is added to the polymer blend compositions outstanding impact strength is maintained. Generally, up to about 10 wt. %, based on the total weight of the first, second and third polymers, will be present.

Inorganic fillers may also be present. Common fillers include inorganic compounds, such as minerals and salts. More preferred fillers are calcium carbonate and talc $(Mg_3Si_4O_{10}(OH)_3)$, and glass fibers. Most preferred is glass fibers. The amount of filler that can be added to the composition of the present invention is generally up to about 30 weight %, based on the weight of the first, second and third polymers.

Heat stabilizers can optionally be used. Suitable heat stabilizers include, for example, a calcium/phosphate derivative of a hindered phenol sold under the trademark Recyclostab® 411 by Ciba Geigy Chemicals. The heat stabilizer compound can also be a compound selected from the group consisting of hydroxyamines, phenols, phosphates and metal soaps.

Suitable optional antioxidants include alkylated phenols and bis-phenols such as hindered phenols, polyphenols, thio and di-thio polyalkylated phenols, lactones such as 3-arylbenzofuran-2-one and hydroxylamine as well as Vitamin E.

The above-described processable compositions may be made from virgin components or they may be composed of elements from waste streams for recycling. As such, the blends are easily processable or recyclable due to the synergistic effect of the combination of polar copolymer and water.

The process of the invention comprises the steps of providing the polymer blends that are described above, subjecting them to mixing under high shear conditions to form a composite that is a homogeneous blend and recovering the composite. In most cases, this will result in a highly homogenous blend of the polymers. The process is adaptable for recycling materials formed of dissimilar polymers, especially those wherein the components are mixtures of polar and non-polar polymers.

Mixing is preferably accomplished by melt blending under high shear conditions. By high shear conditions is meant that the shear forces present are similar to those generated in a co-rotating twin-screw extruder such as those known to practitioners skilled in the art of compounding polymer blends. The separate ingredients may be combined as a pellet blend or they may be mixed via simultaneous or separate metering of the various components. In a recycling process, the components of the waste stream may be treated prior to mixing by grinding or other processes that comminute or convert the components into particles or small pieces. The components may also be divided and blended in one or more passes into one or more sections of high shear mixing equipment, for example extruders, Banbury mixers, or kneaders. High shear conditions insure that proper dispersion of the components occurs which can promote coupling reactions and formation of a continuous phase or homogeneous multiple phases.

Generally, extrusion melt blending is preferable for large scale operations because it is very economical.

The extruded polymer blends, or composites, are characterized by excellent Izod impact strength. For example, extruded blends made from 99 wt. % of a mixture of 9 wt. % EVOH with 91 wt. % high density polyethylene blended with 1 wt. % of a random copolymer of ethylene and monoethyl maleate where the EVOH and high density polyethylene components contain approximately 700 parts of water before extrusion compounding have impact strengths in the range of 1070-1230 J/m. In contrast, similar compositions where a conventional maleic anhydride grafted resin is used as a compatibilizer have Izod impact strengths that are significantly lower.

Once extruded, the composites are recovered and may be formed into shaped articles by such processes as extrusion or injection molding. Particularly useful articles made by extrusion processes would include tubes, rods, pipes, wire coatings and boards.

Compositions made according to the process of the present invention can be formed into shaped articles using methods such as injection molding, compression molding, overmolding, or extrusion. Optionally, the composites produced by the process can be isolated as particular physical forms that may be further processed. For example, pellets, slugs, rods, ropes, sheets and molded articles of the present invention may be prepared and used for feedstock for subsequent operations, such as thermoforming operations, in which the article is subjected to heat, pressure and/or other mechanical forces to produce shaped articles. Compression molding is an example of further processing.

While inclusion of certain optional components can be preferred, the exclusion of any optional component can be warranted for any reason. Such reasons can include cost, aesthetics, or any other consideration deemed important to the practitioner. For example, an optional component can be excluded to provide an economic advantage over similar products.

The invention is illustrated by the following embodiments wherein all parts are by weight unless otherwise specified.

EXAMPLES

Example 1

A polymer blend composed of 91 parts of a polyethylene having a density of 0.962 g/cc and a melt index of 1.0 g/10 minutes, sold under the name of Sclair® 19A polyethylene by Nova Chemicals Corp., and 9 parts of an ethylene vinyl alcohol (EVOH) polymer having a melt index of 5.7 g10 minutes and containing 44 mol % vinyl alcohol, sold under the trade name EVAL E105 resin, was prepared by extrusion compounding using a Werner & Pfleiderer ZSK-30 twin screw extruder having 30 mm screws. All materials were fed to the extruder at the feed-throat as pellet blends that were premixed in polymer bags The temperature of the barrel and die were maintained at 220° C. during the extrusion process. The EVOH polymer had been immersed in water at 23° C. for 24 hours prior to extrusion. The water content of three samples of the extruded polymer blend was determined using a Vapor Pro® moisture analyzer and the average value was found to be 700 ppm. The polymer blend, in an amount of 99.5 parts, was further blended with 0.5 parts of an ethylene copolymer (dipolymer) having 9 wt. percent copolymerized units of the monoethyl ester of maleic acid to form a composite material. The ethylene copolymer was prepared by a high pressure, free radical copolymerization process. Blending was conducted by extrusion compounding using the same equipment and conditions employed to prepare the polyethylene/EVOH blend. Physical properties of the composite material, measured from injection-molded specimens, are shown in Table I. Notched Izod was measured according to ASTM D256. Flexural modulus was measured according to ASTM D790. Tensile strength was measured according to ASTM D638.

Example 2

A sample of the polyethylene/EVOH blend of Example 1, in an amount of 99.0 parts, was blended with 1.0 part of the ethylene copolymer of Example 1 to form a composite material. The same equipment and conditions employed in Example 1 were used. Physical properties of the extruded composite material are shown in Table I.

Comparative Example A

Physical properties of a sample of the polyethylene/EVOH blend of Example 1 are shown in Table I. This data is designated Comparative Example A.

Comparative Examples B-D

A sample of the same EVOH polymer that was used in Example 1 was dried at a temperature of 90° C. for 48 hours in a circulating air oven. A sample of 91 parts of the polyethylene of Example 1 was mixed with 9 parts of the dried EVOH polymer, using the same equipment and procedure described in Example 1. The physical properties of a sample of the resulting Polymer Blend B are shown in Table I and are designated Comparative Example B. The water content of three samples of the Polymer Blend B was determined using Vapor Pro® moisture analyzer and the average value was found to be 100 ppm.

A sample of Polymer Blend B in an amount of 99.5 parts was extrusion compounded with 0.5 parts of the ethylene copolymer of Example 1 using the equipment and procedure of Example 1. Physical properties of the resulting composite are shown in Table I under the designation Comparative Example C.

A sample of Polymer Blend B in an amount of 99.0 parts was extrusion compounded with 1.0 parts of the ethylene copolymer of Example 1 using the equipment and procedure of Example 1. Physical properties of the resulting composite are shown in Table I under the designation Comparative Example D.

Comparative Examples E

A sample of 99 parts of the polyethylene/EVOH blend of Example 1 was extrusion compounded with 1 part of an ethylene maleic anhydride graft copolymer using the same equipment and procedure employed in Example 1. The graft copolymer was a composition that was composed of a high density polyethylene (0.96 g/cc) that had been grafted with maleic anhydride. The maleic anhydride content of the graft copolymer was 1 wt. %. Physical properties of the resulting extrusion compounded composite material are shown in Table I under the designation Comparative Example E.

Comparative Example F

A sample of 99 parts of Polymer Blend B of Comparative Example B was extrusion compounded with 1 part of the graft copolymer of Comparative Example E using the same equipment and procedure employed in Example 1. Physical properties of the resulting extrusion compounded composite material are shown in Table I under the designation Comparative Example F.

TABLE I

| | Sample | | | | | | | |
|---|---|---|---|---|---|---|---|---|
| | Example 1 | Example 2 | Comp. Ex. A | Comp. Ex. B | Comp. Ex. C | Comp. Ex. D | Comp. Ex. E | Comp. Ex. F |
| Tensile Strength at Break (MPa) | 18.8 | 17.6 | 13.7 | 15.4 | 17.8 | 18.1 | 11.9 | 15.7 |
| Std. Deviation (MPa) | 1.0 | 0.34 | 0.52 | 1.1 | 0.23 | 0.16 | 3.1 | 0.79 |
| Elongation at Break (%) | 138 | 154 | 77 | 80 | 49 | 51 | 85 | 56 |
| Std. Deviation (%) | 25 | 15 | 5 | 5 | 2 | 5 | 13 | 2 |
| Flexural Modulus (MPa) | 1430 | 1470 | 1410 | 1460 | 1480 | 1430 | 1460 | 1470 |
| Std. Deviation (MPa) | 76 | 69 | 69 | 83 | 83 | 76 | 55 | 83 |
| Notched Izod Impact Strength (J/m) | 1230 | 1070 | 320 | 1010 | 1120 | 1020 | 854 | 907 |
| Std. Deviation (J/m) | 24 | 100 | 72 | 22 | 52 | 53 | 150 | 46 |
| Partial Break | 5 | 5 | 5 | 5 | 5 | 5 | 5 | 5 |

What is claimed is:

1. A process for preparing a polymer composite comprising the steps of
   A. forming a composition by combining
      1. a polymer blend consisting essentially of
         a. a first polymer selected from the group consisting of polyethylenes and copolymers of ethylene and a $C_3$-$C_{10}$ alpha-olefin; and
         b. a second polymer that is an ethylene vinyl alcohol polymer;
         wherein said polymer blend has a moisture content greater than 250 ppm water, based on the total weight of said first and second polymers; and
      2. a third polymer that is a polar copolymer produced by a high pressure random copolymerization process, said polar copolymer comprising copolymerized units of ethylene and from about 3 wt. % to about 25 wt. %, based on the weight of the polar copolymer, of a comonomer selected from the group consisting of $C_4$-$C_8$ unsaturated anhydrides, monoesters of $C_4$-$C_8$ unsaturated acids having at least two carboxylic acid groups, diesters of $C_4$-$C_8$ unsaturated acids having at least two carboxylic acid groups and mixtures thereof;
      wherein said composition consists essentially of, based on the total weight of said first, second and third polymers, 55-89 wt. % of said first polymer, 2-45 wt. % of said second polymer and 0.1-10 wt. % of said third polymer;
   B. subjecting said composition to high shear mixing to form a polymer composite that is a homogeneous blend; and
   C. recovering said polymer composite.

2. A process of claim 1 wherein said first polymer is a polyethylene.

3. A process of claim 1 wherein said first polymer is a copolymer of ethylene and a $C_3$-$C_{10}$ alpha-olefin.

4. A process of claim 1 wherein said polar copolymer comprises copolymerized units of ethylene and a $C_4$-$C_8$ unsaturated anhydride.

5. A process of claim 1 wherein said polar copolymer comprises copolymerized units of ethylene and a monoester of a $C_4$-$C_8$ unsaturated acid having at least two carboxylic acid groups.

6. A process of claim 4 wherein said unsaturated anhydride is maleic anhydride.

7. A process of claim 5 wherein said monoester is ethyl hydrogen maleate.

8. A process of claim 1 wherein said polymer blend has a moisture content of greater than 300 ppm water, based on the total weight of said first and second polymers.

9. A process of claim 1 wherein said first polymer is a polyethylene.

10. A process of claim 1 wherein said first polymer is a copolymer of ethylene and a $C_3$-$C_{10}$ alpha-olefin.

11. A process of claim 1 wherein said composition additionally comprises a lubricant.

* * * * *